United States Patent
Wakefield

[19]

[11] Patent Number: 6,026,999
[45] Date of Patent: Feb. 22, 2000

[54] CONCENTRIC TOOL BOX FOR MOTORIZED CONVEYANCES

[75] Inventor: James Theodore Wakefield, Palmoale, Calif.

[73] Assignee: Defs Inc., Las Vegas, Nev.

[21] Appl. No.: 09/027,317

[22] Filed: Feb. 20, 1998

[51] Int. Cl.$^7$ ................................................ B62D 43/00
[52] U.S. Cl. .................... 224/42.12; 220/4.22; 220/4.24; 220/4.25; 224/42.14; 224/42.2; 224/42.24; 296/37.1; 296/37.2
[58] Field of Search .............................. 224/42.12, 42.14, 224/42.18, 42.19, 42.2, 42.21, 42.23, 42.24, 42.26, 42.3; 296/37.1, 37.2; 220/23.8, 23.4, 4.22, 4.24, 4.25

[56] References Cited

U.S. PATENT DOCUMENTS

| | | | |
|---|---|---|---|
| 2,588,957 | 3/1952 | Brown | 312/200 |
| 4,187,639 | 2/1980 | Ono | 47/58.1 |
| 4,561,705 | 12/1985 | Schaefer | 312/244 |
| 4,708,256 | 11/1987 | Intardonato | 220/23.4 |
| 5,294,012 | 3/1994 | Shott et al. | 220/23.4 |
| 5,429,285 | 7/1995 | Kim | 224/42.14 |
| 5,447,110 | 9/1995 | Brown | 141/2 |

FOREIGN PATENT DOCUMENTS

2250248A   3/1992   United Kingdom ................ 224/42.12

*Primary Examiner*—Gregory M. Vidovich
*Assistant Examiner*—Maerena W. Brevard

[57] ABSTRACT

A concentrically shaped, moisture and dust resistant apparatus for storing tools and roadside emergency equipment. The device is designed to remain in a suspended state between the wheel of a spare tire and the underside of a motor vehicle. It is positioned above the spare tire on the metal portion of the wheel and is held in place by means of a factory installed winch system. The principal object has two separate, semi-circular compartments which, when joined, form a spherically shaped apparatus. An inner circular opening located at the mid-point of the principal object allows a spare tire retention cable and its fastening means to be received and passed through it. The arcuate exterior has positioned upon it three essentially flat and level surface segments: one at 180 degrees at the bottom of the device and two on adjacent, but opposite sides of the principal object, at 90 and 270 degrees, respectively. The flat and essentially level segments provide stability to the invention so that the device may remain in an upright position when the apparatus is in either an open or closed position. One of the storage bins is a storage compartment only, the other storage bin has within it a removable storage tray.

10 Claims, 7 Drawing Sheets

CONCENTRIC TOOL BOX FOR MOTORIZED CONVEYANCES

CROSS-REFERENCE TO RELATED APPLICATIONS

Not Applicable

REFERENCE TO A MICROFICHE APPENDIX

Not Applicable

BACKGROUND OF THE INVENTION

1. Field of Invention

The principal object relates in general to tools and toolboxes; however, in particular, it pertains to a rigid, concentrically designed tool storage container which is capable of being placed within the wheel of a spare tire. Said tire would normally be located on the exterior of either a domestic or foreign motor vehicle, suspended under the frame or bed by means of a factory installed winch system.

2. Description of the Prior Art

The principal object is an apparatus that is designed specifically for the storage, organization and transportation of tools and other roadside emergency equipment. Tool boxes, tool chests and tool cases are, more often than not, rectangularly shaped. A toolbox can be small, compact and portable, or it can be large and remain primarily in one general area or work site. Toolboxes are formed out of various materials and have been adapted for a variety of functions and utilities in the workplace, home, garage or automobile.

Individuals from all walks of life have, on occasion, seen fit to use, or have observed someone else use, a tool or a mechanical device. At one point or another in a motorist's driving experience, it can be reasonably anticipated that he or she will face a situation wherein a tool, or a set of tools will be required to prevent, correct or repair a mechanical problem that is encountered while operating a motor vehicle. Although mechanical problems vary in scope from minor to major, any one of a number of situations could require the immediate or continued use of a tool or mechanical device. Because the precise nature of mechanical failures, which affect automobiles, may not be predicted with any degree of certainty, various types of tools and emergency equipment are appropriately carried within a motorized conveyance.

The previous state of the art for a tool box that is designed for installation and adaptation to a motor vehicle includes, but is not limited to, the UNDERHOOD TOOL BOX, invented by Walter D. Bensch, U.S. Pat. No. 4,660,880, and the OVER WHEEL WELL TRUCK TOOL BOX, Design Patent 279,664, which was invented by John E. Waters, Junior.

Bensch's invention is specifically crafted for installation inside an automobile's engine compartment; it is a well-designed tool box, and it provides the user with the convenience of storing tools in the forward section of a motor vehicle. Unfortunately, by positioning the toolbox under the hood, in close proximity to an internal combustion engine, the tools, as well as the box itself, are predisposed to temperature extremes. Operation of a motor vehicle engine creates a significant amount of heat. Engine heat is capable of permeating a tool or any other item placed within the UNDERHOOD TOOL BOX.

Waters' device, is a well-conceived and designed invention. Unlike the principal object, it is incapable of being stored out of view, or being adapted to a wheel and tire. Waters' OVER WHEEL WELL TRUCK TOOL BOX is designed to remain in the bed of a truck occupying space that is normally intended for storage and transportation of cargo.

Neither Waters' nor Bensch's inventions can be placed within the wheel of a spare tire which is stored under the bed of a truck, or the under carriage of a car, van or sports utility vehicle as can the principal object. Additionally, the principal object would not be subjected to engine heat or direct exposure to the elements in the same manner as that of Waters or Bensch. A particular advantage of the principal object is that it is easily installed. The invention is not required to be permanently mounted or affixed to a motor vehicle. Furthermore, it occupies no space that is otherwise intended for the storage or transportation of persons and/or things. The principal object is efficiently engineered to make use of previously unused space within the confines of the concave portion of a spare tire and wheel that are connected to the under side of a motor vehicle. Other advantages of the principal object will become increasingly apparent after a thorough review of the drawings, which illustrate the invention's specification.

DETAILED DESCRIPTION OF THE INVENTION

Figure 1:
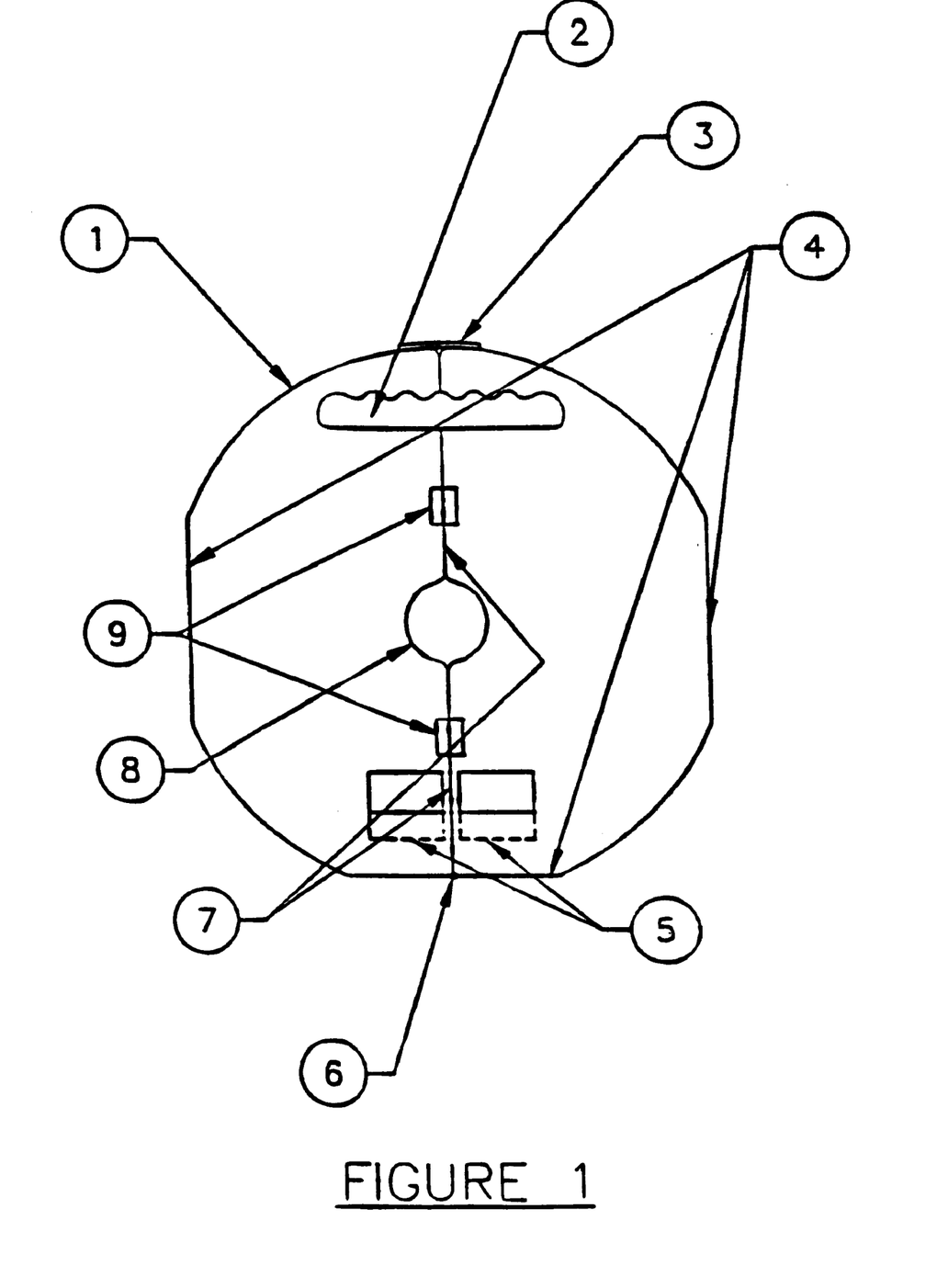
FIG. 1 is a front view of the principal object in a closed position, formed in accordance with the invention.
Figure 2:
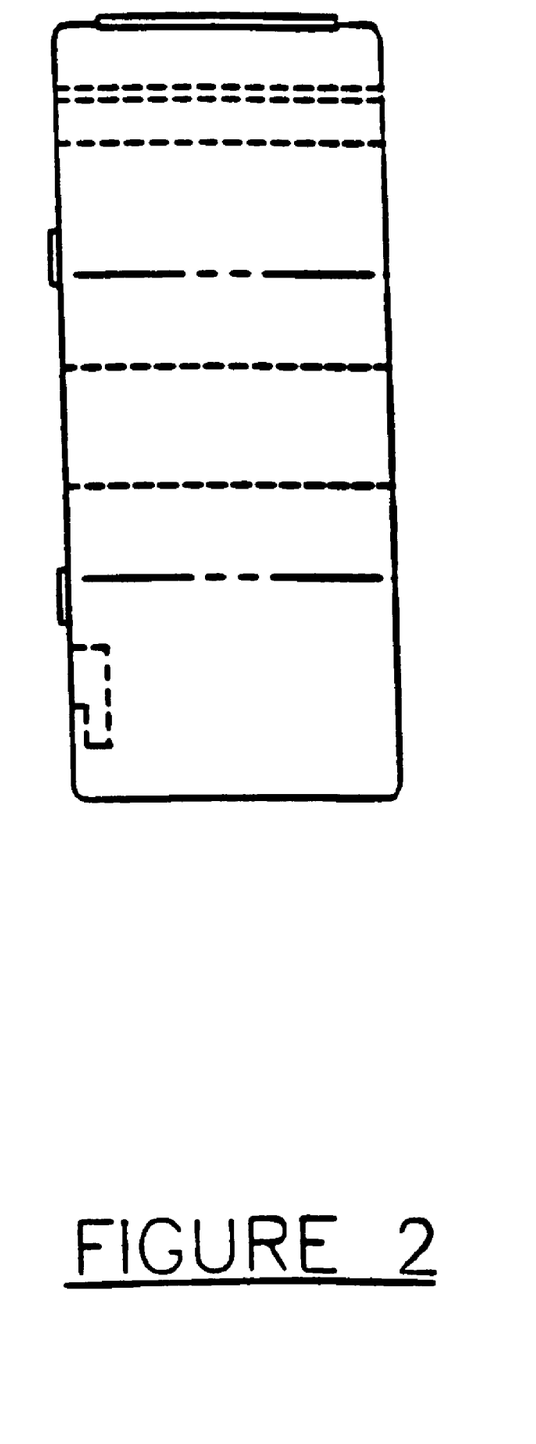
FIG. 2 is a side view of the preferred embodiment of the principal object in a closed position.
Figure 3:
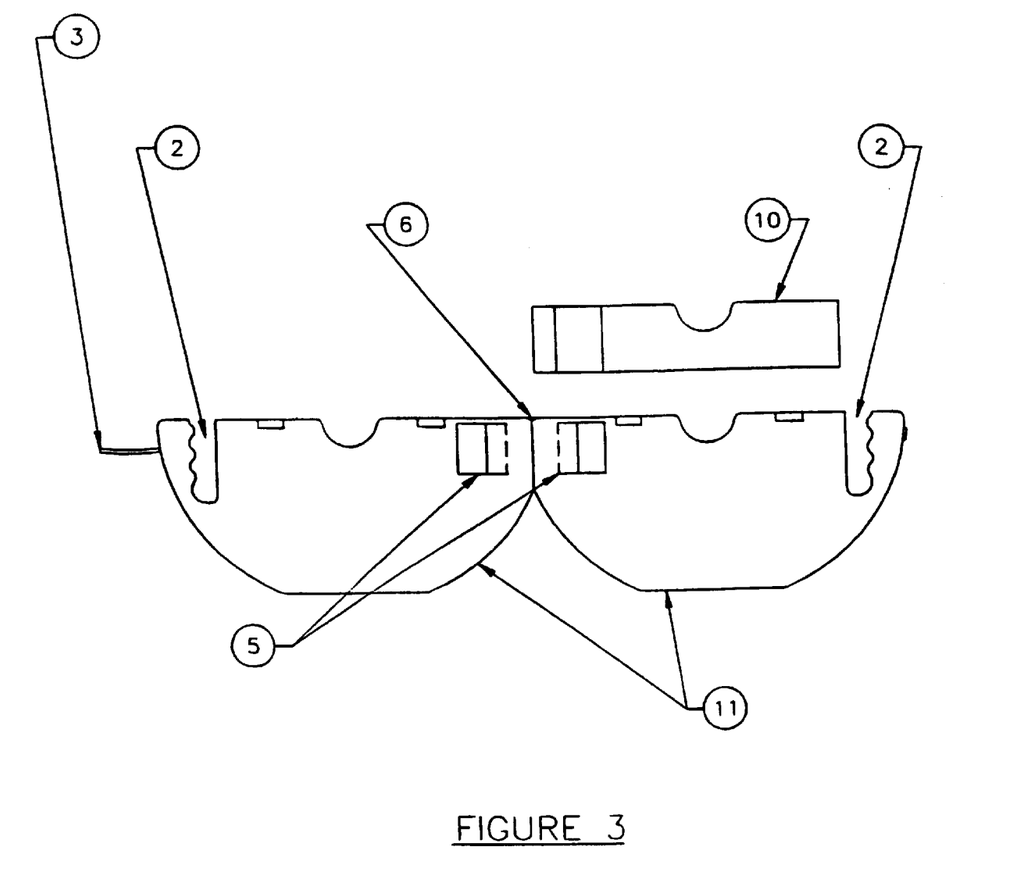
FIG. 3 is a side view of the preferred embodiment of the principal object when in an open position, with the tool storage tray elevated above the apparatus.
Figure 4:
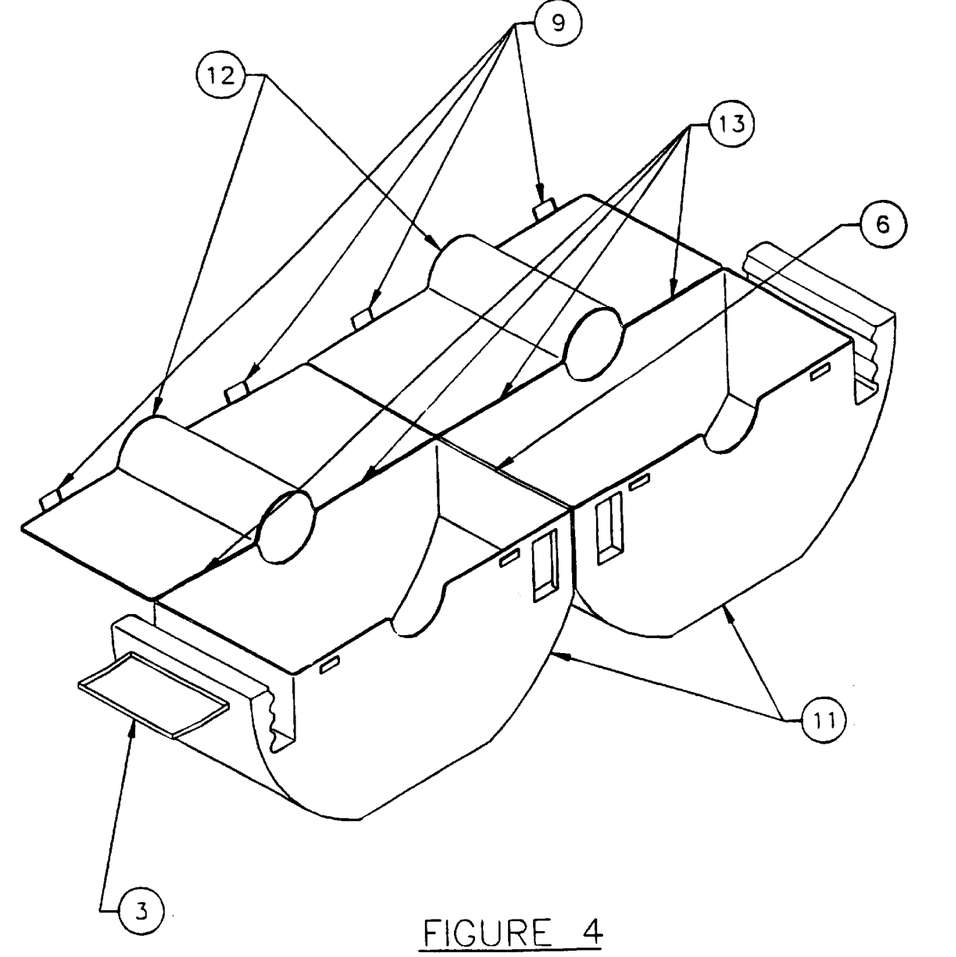
FIG. 4 is a side view of the principal object in an open position and the two storage lids opened at right angles to the dual storage containers.

The accompanying drawings and FIG. 1, in particular, disclosure the preferred embodiment of the tool apparatus, made according to the principal object. The principal object has a concentric design #1, including an arcuately formed base, front and side wall. There are three independent, essentially flat and level, segments located on the circumference of the exterior base, #4. The invention has an inner circular opening. The opening is specifically designed to receive a winch cable and its fastening means #8.

The apparatus has two contiguous storage containers, #11 that are joined by a primary hinge, #6, which are designed to store tools, emergency equipment and those items deemed appropriate by the user. One of the storage bins has a tool tray fashioned in such a manner so as to secure specific tools and items. Other tools and emergency equipment may be placed below the tray inside the container. The tray, #10 is positioned at a point below the storage lid and above the lowest point in the storage hole itself. Furthermore, the removable tray is held in place by the uniquely designed hinged #13, storage lid #12.

The device's primary handle is positioned below the apex of the device, #2. It is an open handhold with a series of molded finger grooves and spacing. The handhold and finger molded grooves provide a means of control over the device when the user has need to pick the device up by hand and subsequently move the apparatus from place to place. There are two additional symmetrical and subordinate front handles, #5 affixed at the lower end of the device on either of the storage containers. The subordinate handholds assist the user in gaining a grip on the device when it is in a recumbent position, resting on the concave wall of a wheel within the rim.

The device has a total of five (5) snap fasteners. The primary snap fastener, #3 is located on the top of the principal object, and it holds the two storage compartments in place and together. Two twin opposing snap fasteners, #9 are located on the front of the principal object's outer case; they hold the storage lids closed over the individual storage containers, #11. The storage lids and the containers are designed to create a moisture and dust resistant environment. The storage lids and the walls of the storage compartments have a tongue and groove design. The storage walls have the tongue and the storage lids have the groove. The connection is further sealed by means of weather stripping material. The weather stripping could prevent moisture and/or dust from penetrating and collecting within the principal object. The water and dust resistant environment is intended to retard rust and corrosive materials from attacking and damaging those items stored within the apparatus for long periods of time.

Figure 6:
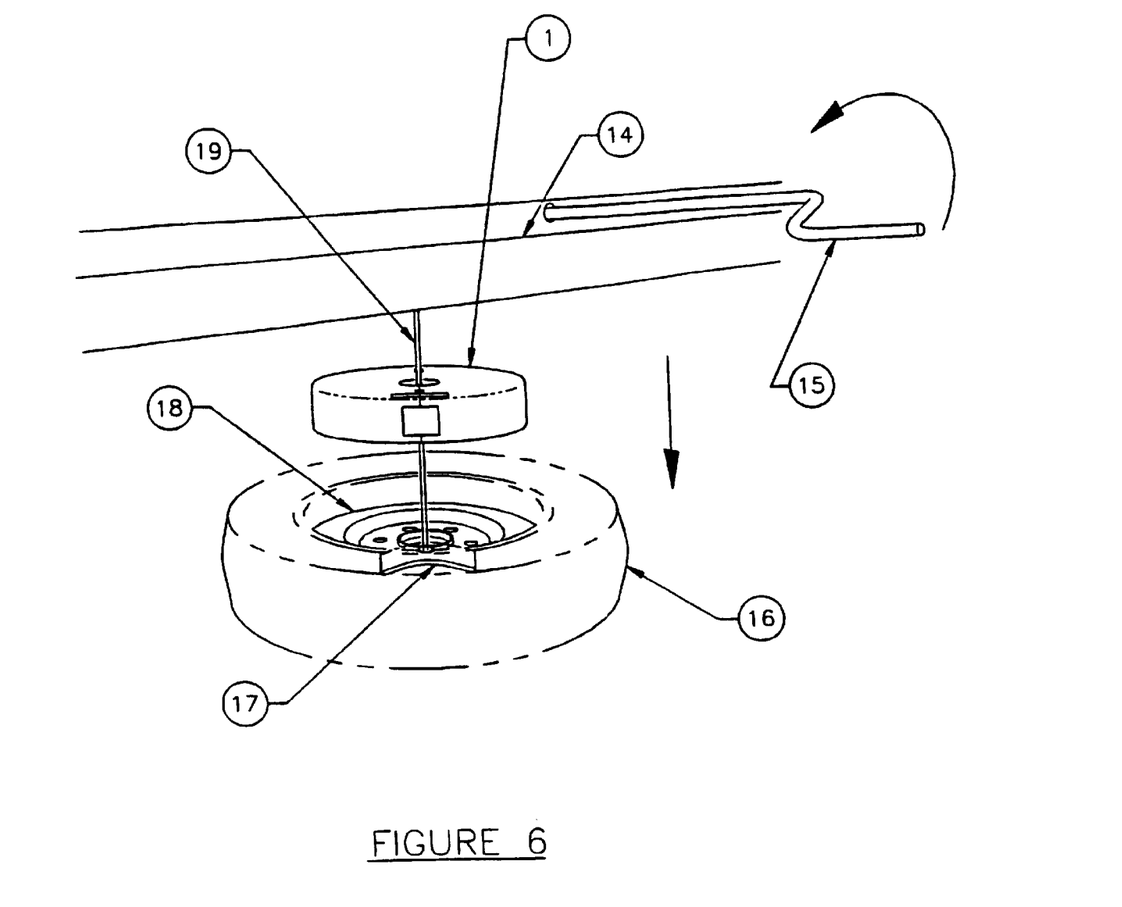
FIG. 6 is a view of the principal object attached to a spare tire winch cable, below the bumper of a motor vehicle and above a spare tire and wheel.
Figure 7:
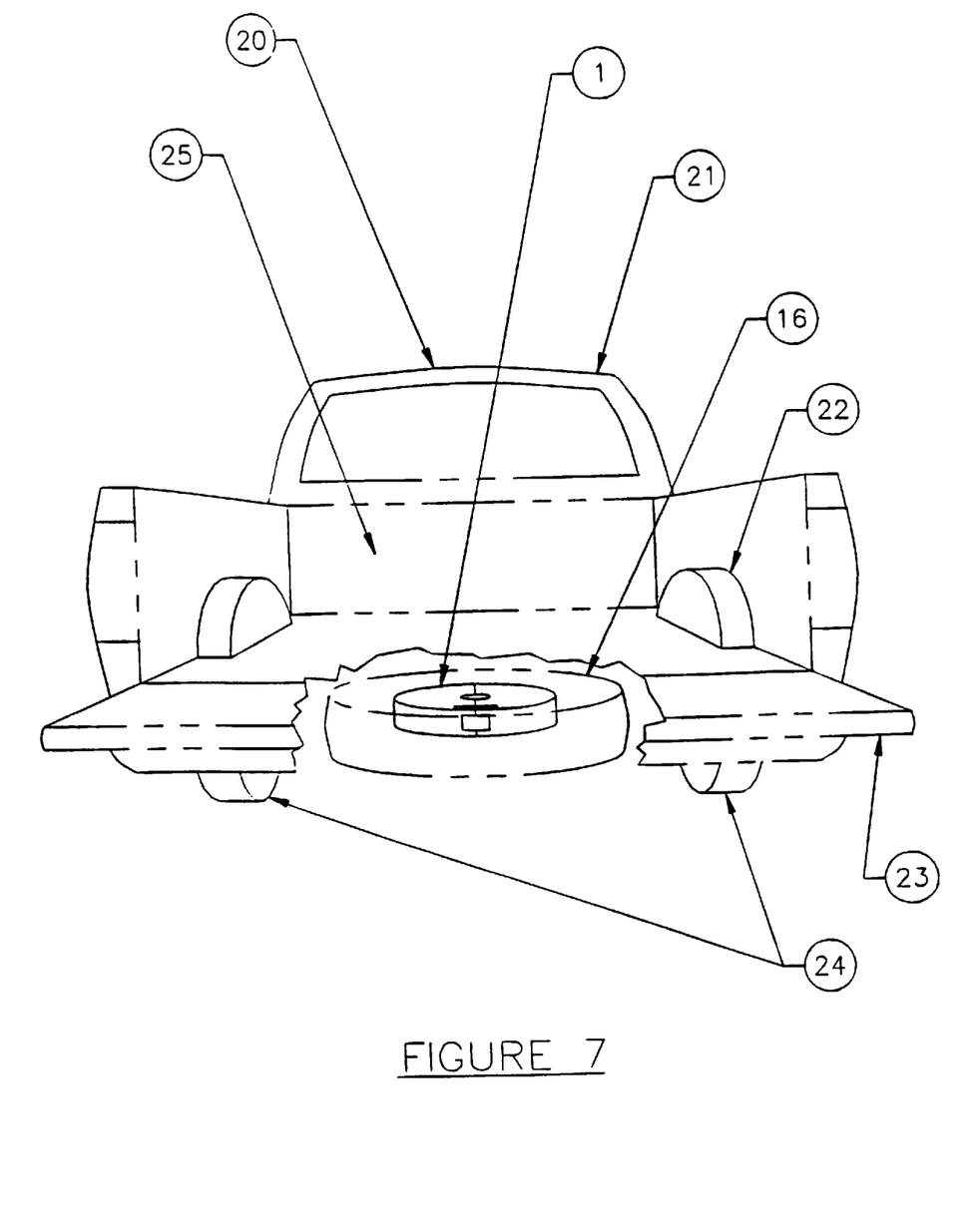
FIG. 7 is a view of the preferred embodiment of the principal object as it would appear when fully adapted into the wheel of a motor vehicle equipped with a factory installed winch, spare tire storage and retrieval system.

In FIG. 7, the principal object is shown installed in a pick-up truck. The truck #20, forms no part of the invention. The pick-up truck has: a cab #21, wheel well #22, tailgate #23, rear tires #24, and a storage bed #25. The truck that is depicted, like numerous other trucks, vans, sports utility vehicles and other motor vehicles, comes equipped from the factory with a spare tire winch system. The spare tire winch system is depicted in FIG. 6, and it includes, but is not limited to: a crank/handle #15, a spare tire #16, a winch appendage fastening means #17, a spare wheel #18, and a winch cable #19.

Figure 5:
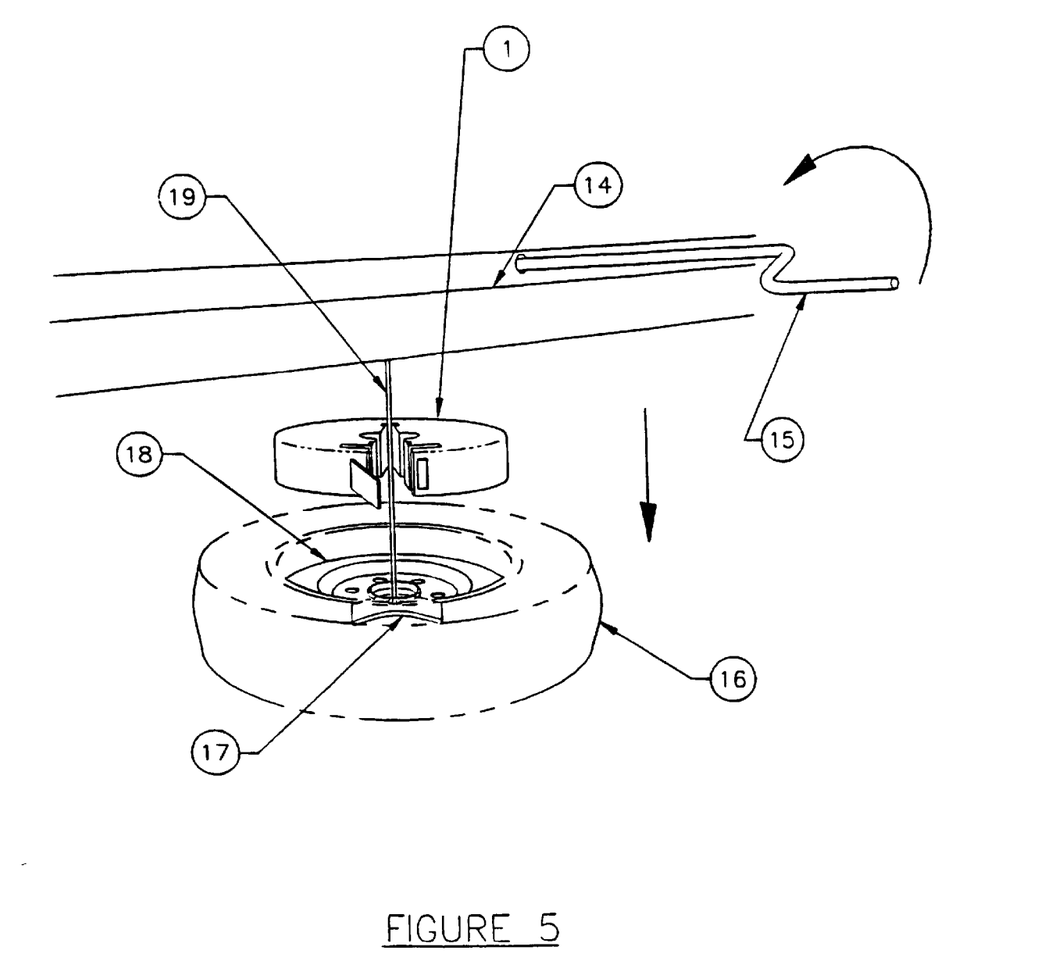
FIG. 5 is a view of the principal object with the two storage compartments partially spread apart just prior to adaptation or removal from a winch spare tire retention cable, below the bumper of a motor vehicle and above a spare tire and wheel.

The principal object may be adapted to any conveyance that has a factory installed spare tire winch retention system, or that offers the opportunity to utilize the concave segment of a spare tire and wheel for storage of the principal object. Currently, various makes and models of domestic and foreign cars, trucks, sports utility vehicles and vans, sold in and out of the United States come with a factory winch controlled, spare tire storage and retention system. The principal object is adapted to a conveyance by placing it within the rim and then physically installing it on the wheel of a spare tire. The spare tire is one that may be affixed to the under side of a conveyance. As depicted in FIG. 5, the spare tire #16, wheel #18 and the principal object #1 may be joined together by means of cable #19 and an appendage fastening means #17. The winch system includes, but is not limited to: a crank or handle, a cable, a pulley and a ratchet locking mechanism. The winch controls the position of the spare tire and wheel. The spare tire is stored in the rear section of the motor vehicle, adjacent to the tailgate, rear access door or bumper. When the winch system is activated, the ratchet control mechanism causes the spare tire to either be raised or lowered.

The inner wall of a motor vehicle's wheel is specifically designed to be placed against the wheel mounting surface. A wheel-mounting surface includes, but is not limited to: a brake drum or brake disk and axle. Since the inner wall is fitted directly against a brake mechanism and axle, it tends to be of a more rounded inner development than that of the exterior wheel wall. Often times the interior wall of a wheel is arcuately fashioned and concave.

There is a general tendency, in manufacturing automobile wheels is for the outside wall of the wheel to be more convex than that of the inner wheel wall. In some cases the outer wheel wall favors an alignment that is closely akin to that of the wall of the tire mounted on it. Nevertheless, that side of a wheel, which is most concave, is the most appropriate one for selection and use to host the principal object. Motor vehicle wheels have a series of small circular holes formed within them. These small through and through holes extend from the interior wall out to the exterior wall of the wheel. Furthermore, there is a single, larger through-and-through hole located at the mid-point of a motor vehicle wheel. The smaller series of holes is designed to allow a lug hub or stud to protrude through it. The lug hub/studs are threaded. The lug hub/studs receive the lug nuts. The single larger hole is designed to receive the end portion of a vehicle's axle. Once a wheel and tire have been attached to the wheel-mounting surface, the lug nuts are tightened on to the lug hubs. Tightening the lug nuts forces the wheel into place. Afterwards, a hubcap is generally added to the exterior wall of the wheel; it is used to conceal the exposed lug nuts and axle.

The principal object may be placed inside a spare tire and wheel in one of two methods. First, the invention may be placed within the spare tire and wheel after the spare tire has been completely removed from the winch storage system and vehicle. The second method involves lowering the spare tire and wheel so that access to the wheel, winch cable and the area above the tire may be freely gained. In the second method, the wheel and tire remain connected to the vehicle at all times.

In the first method the winch is lowered until the cable and fastening means can be manually removed from the wheel. The spare tire is then placed on the ground. The principal object is placed above the spare tire, and the winch cable's fastening means may then be inserted through the devices large circular opening. The invention's inner opening is large enough to accommodate the winch cable and the appendage fastening means; they both are passed through the device to the tire. The invention's centralized circular opening mirrors that of a wheel's large central through-and-through opening. After all the slack in the winch cable is then taken out, the spare tire is hoisted to its normal storage position beneath the frame or bed of the motor vehicle. The principal object remains in a recumbent position on the concave wall of the spare tire's wheel until such time as it is needed.

In the second method of installing the principal object, the winch system is lowered, and the tire is placed at or just above the ground. The cable and fastening means "are not" removed from the wheel and spare tire. The tire remains suspended from the winch cable. The primary snap fastener on the top section of the principal object is unfastened, then the invention is manipulated. The storage compartments are spread apart. The hinged storage compartments are moved apart just enough to make room for the winch cable; it slides between them. The winch cable travels between the storage bins and their lids to the opening at the middle of the principal object. The cable passes to the center of the principal object without interfering with any portion of the invention. After the winch cable has reached the device's inner-circle, the primary snap fastener is re-fastened. The inner circle is designed so as to close around the winch cable. The principal object is then adapted to the top of the wheel wall and spare tire and rests there available for roadside emergencies or future automotive repair needs. The weight of the concentric toolbox and its contents, should never exceed the weight limits listed on the manufacturer's specification table for the cable and fastening means.

The primary handhold facilitates the grip and control of the apparatus when it is manually carried. The principal object's primary snap fastener keeps both of the storage holes closed together. When the primary snap fastener is released, the principal object's storage holes are capable of moving in opposite directions, from one another. To gain access to the contents of either or both of the storage containers, the device's containers may be spread completely apart and the lids opened. The two storage lids are mounted over the storage compartments. The twin pair of secondary snap fasteners is designed to secure the storage lids to the storage compartments and to keep tools and other equipment from falling or spilling out. The principal object has two, subordinate, horizontally positioned, handholds at the lower region of the front side of the apparatus. The matching handholds are affixed above two pre-cast triangularly shaped cavities created in the front side of both of the storage containers. The twin frontal handholds allow control of the apparatus at those times that it is to be placed in or removed from its resting place above the spare tire's wheel. The twin handles are designed to facilitate control over the apparatus.

The principal object may be manufactured from thermoplastic, rubber, composite materials, metal, alloy or any combination thereof. The apparatus has a large cargo capacity and can be easily adapted to full-size cars, trucks, vans and sports utility vehicles. The physical nature of the invention is such that it is predisposed to fit easily within the spare tire and wheel of any motorized conveyance equipped with a spare tire winch retention system. The invention can easily receive and store a vast array of items considered necessary for safe operation, maintenance or roadside repair of a motor vehicle.

The device's ability to store tools and equipment includes, but is not limited to, the following: metric and standard sized tools of varying shapes and utilities, a first-aid kit, battery jumper cables, snow chains or snow cables, electrical tape, duct tape, gloves, a tarp, cargo storage net, flares, a tire repair kit, tire pressure gauge, flash light, safety vest, warning devices, trailer hitch, tow ball, tie downs, bungie cords, rope, spare hoses, cables, fuses, bulbs, oil, anti-freeze or other liquids and such other devices which are desired or believed to be important in an emergency situation. Items placed in the principal object would be those that the manufacturer, owner or operator of a particular motorized conveyance deems fit or beneficial for inclusion. The principal object can be sized to fit within the circumference of any small, medium or large motor vehicle wheel. The principal object may also be adapted for use with commercial vehicles and farm equipment.

Since the preferential embodiment of the principal object has been duly described and depicted in detail, it should be clearly and fully apparent to anyone that is skilled in the art that any number of physical modifications and changes may be made to the aforementioned invention without altering the invention's concept and or its principal nature and embodiment. The principal object is to be considered, in all aspects, as illustrative and not restrictive. The full scope of the principal object is indicated by the appended claims. Any and all changes or variations which may come or happen to fall within the scope, meaning or range of this or any other equivalencies to the following claim are to be embraced therein.

I claim:

1. A portable, hand-held rigid, thermoplastic, tool storage apparatus designed to be contained within the hub of a motor vehicle spare tire, comprising:

a pair of matching individually lidded, contiguous bins, hinged together, which when closed by means of a primary snap fastener, define a substantially tubular-shaped receiver therebetween, containing a circular axial opening for accommodating a winch cable therein, and each said bin possessing a carrying handle.

2. The apparatus as recited in claim 1, wherein each bin has vertical front and back walls and side walls connecting the front and back walls, wherein the front, back, and side walls define a bin opening, and each lid extends between said side walls.

3. The apparatus as recited in claim 1, wherein the circular axial opening accommodates a winch cable for the purpose of positioning the apparatus within the hub of a spare tire and the primary snap fastener is located on the apex of the apparatus when in its closed position for holding the bins in place and together.

4. The apparatus as recited in claim 2, wherein each said carrying handle is an indentation molded along the bottom portion of each said front wall of each bin.

5. The apparatus as recited in claim 1, wherein each said bin has a recessed area along its top that when each bin is closed by said primary snap fastener forms a main carry hole.

6. The apparatus as recited in claim 1, wherein the pair of bins are hinged by a primary hinge installed to position a connecting rod of the hinge inward between the bins, thus permitting the two bins to remain connected and swing open, yet lay flat on a surface without canting or toppling when the apparatus is in use and the primary snap fastener is disengaged.

7. The apparatus as recited in claim 1, wherein each of the bins has three independent and separate flat, level segmented portions located on the side walls, which occur at 90, 180, and 270 degrees, respectively, from the apex of the apparatus when said apparatus is closed to facilitate a balanced stationary placement when the apparatus is either closed or opened.

8. The apparatus as recited in claim 2, wherein each lid of the lidded bins being hinged along the top edge of each respective back wall, each lid being lockable by means of subordinate snap fasteners which connect to the front wall of each bin, respectively.

9. The apparatus as recited in claim 8, wherein each bin and respective lid are designed to be water and dust resistant by a tongue and groove construction reinforced with weather stripping.

10. The apparatus as recited in claim 1, wherein one of the bins has a removable tool storage tray which rests on two flat outcroppings lining the inner surface of said one bin, thus supporting the storage tray in a horizontal manner within the one bin; said tray provides for the organization of tools and certain miscellaneous objects therein, while permitting storage below in the one bin.

* * * * *